United States Patent
Hannetel et al.

(10) Patent No.: US 11,718,971 B2
(45) Date of Patent: Aug. 8, 2023

(54) EXCAVATOR ARM

(71) Applicant: Liebherr-France SAS, Colmar (FR)

(72) Inventors: Jules Hannetel, Colmar (FR); Jeremie Grimaud, Horbourg-Wihr (FR); Guillaume Elbel, Colmar (FR)

(73) Assignee: Liebherr-France SAS, Colmar (FR)

( * ) Notice: Subject to any disclaimer, the term of this patent is extended or adjusted under 35 U.S.C. 154(b) by 351 days.

(21) Appl. No.: 16/903,272

(22) Filed: Jun. 16, 2020

(65) Prior Publication Data

US 2020/0392694 A1 Dec. 17, 2020

(30) Foreign Application Priority Data

Jun. 17, 2019 (DE) .................. 102019116394.3

(51) Int. Cl.
*E02F 3/38* (2006.01)

(52) U.S. Cl.
CPC ........... *E02F 3/38* (2013.01); *B60Y 2200/412* (2013.01)

(58) Field of Classification Search
None
See application file for complete search history.

(56) References Cited

U.S. PATENT DOCUMENTS

| | | | |
|---|---|---|---|
| 4,428,173 A * | 1/1984 | Knell | E02F 3/38 414/722 |
| 6,158,949 A | 12/2000 | Walth et al. | |
| 8,505,258 B2 * | 8/2013 | Durney | B29C 53/063 493/356 |
| 9,650,756 B2 * | 5/2017 | Ulrich | E02F 3/38 |
| 9,662,746 B2 * | 5/2017 | Ulrich | B23K 31/02 |
| 10,815,637 B2 * | 10/2020 | Panni | E02F 3/32 |
| 2011/0150618 A1 | 6/2011 | Ramun | |

FOREIGN PATENT DOCUMENTS

| | | |
|---|---|---|
| CN | 202324021 U | 7/2012 |
| CN | 203229979 U | 10/2013 |
| CN | 204163127 U | 2/2015 |
| DE | 102017121516 A1 | 3/2019 |
| EP | 3336262 A1 | 6/2018 |
| JP | 2007297874 A | 11/2007 |
| KR | 20140002072 U | 4/2014 |

\* cited by examiner

*Primary Examiner* — Michael S Lowe
(74) *Attorney, Agent, or Firm* — McCoy Russell LLP

(57) ABSTRACT

An excavator arm for an excavator as a link between excavator boom and attachment, wherein the excavator arm substantially is formed by a box-like sheet metal construction, and wherein at least one bearing plate is applied onto an end plate of the sheet metal construction.

13 Claims, 2 Drawing Sheets

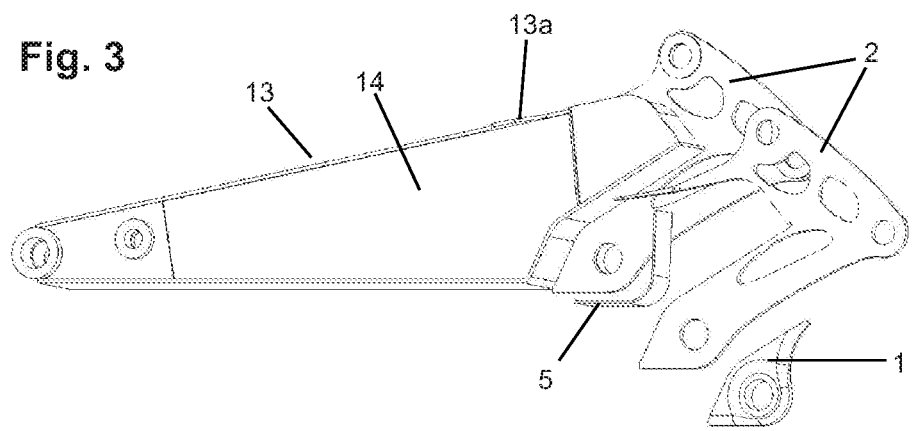
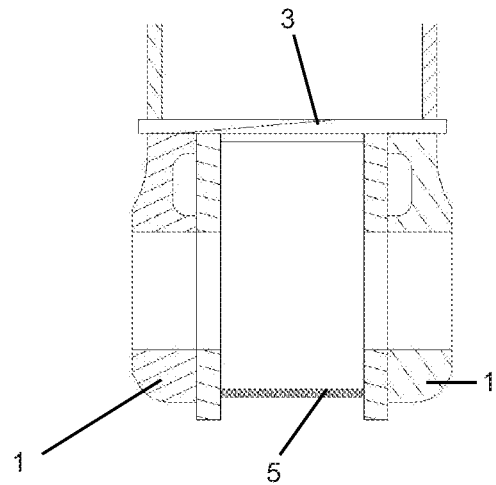

EXCAVATOR ARM

CROSS-REFERENCE TO RELATED APPLICATIONS

The present application claims priority to German Patent Application No. 102019116394.3, entitled "EXCAVATOR ARM", and filed on Jun. 17, 2019. The entire contents of the above-listed application is hereby incorporated by reference for all purposes.

TECHNICAL FIELD

An excavator arm for an excavator as a link between an excavator boom and attachment, wherein the excavator arm is substantially formed by a box-like sheet metal construction.

BACKGROUND

A generic excavator arm constitutes the link between an attachment, such as a backhoe, and the boom of a construction machine. The boom can be fabricated as a monoblock. For connection to the excavator boom and for the assembly of the attachment, the box structure requires suitable bearing points. The bearing points for fastening the excavator arm to the machine boom have traditionally been incorporated directly into the sheet-metal box construction, whereby the manufacturing expenditure for the excavator arm becomes far more complicated.

What is desirable, however, is to manufacture such excavator arms as inexpensively as possible. As a secondary objective, a weight saving also is desirable.

SUMMARY

In accordance with this disclosure it is proposed that the at least one bearing point for connecting the excavator arm to the excavator boom no longer is directly incorporated into the box-like sheet-metal construction, but instead at least one bearing plate is applied onto the box-like sheet-metal construction from the outside. This external bearing plate then forms at least one bearing point for pivotally mounting the excavator arm to the excavator boom.

In principle, as described herein, only one bearing plate may be provided, which includes bearing reinforcements for forming the bearing. Alternatively, two or more symmetrical bearing plates may be aligned in parallel, each of which include bearing reinforcements. The bearing reinforcements can be configured as castings or plates.

Two bearing plates aligned parallel to each other can be perpendicularly mounted on a bent end plate of the sheet-metal construction of the excavator arm. Such a suitable bent end plate is provided at the front side of the excavator arm or sheet-metal box construction, i.e. at that end which serves for mounting on the excavator boom.

As described herein, between the two bearing plates aligned parallel to each other at least one casting is incorporated which assumes the corresponding bearing function. For example, the casting is of sleeve-shaped design and is suitable for accommodating a corresponding connecting means, such as a bearing bolt. The connection between casting and bearing plates is effected for example by means of a fillet weld connection or via an adhesive bond independently or in combination.

Such a construction not only can be fabricated less expensively, but also has certain advantages as regards to the stability and possible force transmission between excavator arm and excavator boom. In existing solutions, the bearing so far has been accommodated directly in the box and has been welded there to the sheet metal construction by means of a butt joint seam. As such, butt joint seams not only are more difficult to fabricate and also involve a more time-consuming welding operation, the construction disclosed herein, and the possible use of fillet welding, results in far-reaching advantages as regards to both the manufacturing time and the resulting stability and quality requirements.

According to an advantageous embodiment of the excavator arm, the two bearing plates are identical in design. Theoretically, however, nothing speaks against a different design, for example to account for a special mounting situation.

In one embodiment, the bearing plates are mounted on a bent end plate of the box construction of the excavator arm. The attachment of the bearing plates, however, is not limited to this end plate. For example, at least one of the bearing plates can extend to further surface portions of the excavator arm. It is imaginable for example that the bearing plates extend up to portions of the upper chord or lower chord of the excavator arm, which adjoin the end plate. In some embodiments, the bearing plates end on a substantially planar surface portion of the upper chord of the box construction. It is possible that the bearing plates enclose the boom-side end of the box construction, i.e. extend from the underside of the excavator arm around the end to the upper chord.

Furthermore, it may be advantageous when the portions of the bearing plates ending on the upper chord exhibit a curved course directed towards the lateral edge of the excavator arm. In some examples, the plate forming the upper chord sectionally includes a lateral protrusion beyond the side plates of the box construction positioned vertically at the upper chord, i.e. there is a longitudinal portion of the upper chord comprising a broadened upper chord plate. In this case, the outwardly curved ends of the bearing plates can end only at this lateral extension of the upper chord plate, which provides for an improved force introduction and a more stable connection of the bearing plates.

While the lateral surfaces of the boom bearing or casting are protected by the adjoining bearing plates, the upper and/or lower side of the bearing point or of the casting possibly is exposed. For this reason, the attachment of at least one additional cover plate for the protection of the boom bearing, in particular of the incorporated casting(s), from soiling or damage may be advantageous. What is expedient is the attachment of at least one cover plate to the underside (side of the lower chord) of the bearing/casting. Such a cover plate can be connected, in particular be welded, for example to the two bearing plates and to the bent end plate of the box construction.

In the vicinity of the boom bearing at least one reinforcing plate can be provided. Instead of a plate, however, a casting or a machined part can also be provided as a reinforcement. For example, corresponding annular reinforcing plates around the bearing opening can be mounted on the outside of the bearing plates accommodating the casting. Beside the targeted reinforcement of the bearing opening, the bearing width can also be varied and adapted by this measure so that the arrangement of the parallel bearing plates becomes more flexible. In particular, the distance of the bearing plates relative to each other thereby can be chosen smaller than the required bearing width of the boom bearing.

According to an embodiment of the disclosure, the at least two bearing plates arranged parallel to each other can form at least one further bearing point. What is particularly advantageous is the formation of a further bearing for mounting a cylinder, in particular a hydraulic cylinder. By way of example, reference is made here to the bearing for a bucket cylinder and/or excavator arm cylinder.

Here as well, it can be provided that in the vicinity of the at least one further bearing at least one reinforcing plate is provided, in particular in the form of an annular reinforcing plate around the corresponding opening. Instead of a plate, castings or machined parts can also be provided here as a reinforcement. As the required bearing width for the at least one further bearing point generally is smaller than the distance of the bearing plates to each other, corresponding reinforcing plates now are mounted not on the outside of the bearing plates, but on the inside, i.e. between the two bearing plates. Thereby, the distance of the two bearing plates to each other can be shortened.

Beside the excavator arm, the embodiments of the present disclosure also relate to an excavator comprising an excavator boom and an attachment, wherein the attachment is connected to the excavator boom by means of the excavator arm according to the invention. Accordingly, the excavator has the same advantages and properties as already explained above with reference to the excavator arm according to the invention. A repetitive description therefore can be omitted.

BRIEF DESCRIPTION OF FIGURES

Further advantages and properties will be explained in detail below with reference to an exemplary embodiment illustrated in the Figures, in which:

FIG. 4: shows a sectional representation through the bearing plates of the excavator arm in the vicinity of the boom bearing.

FIGS. 1-4 are drawn approximately to scale. However, other relative dimensions may be used, in other embodiments.

DETAILED DESCRIPTION

Figure 1:
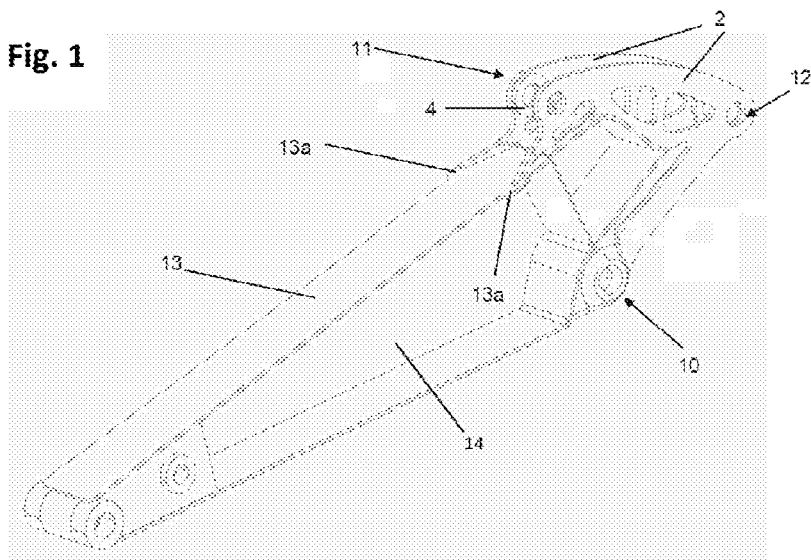
FIG. 1: shows a perspective side view of the excavator arm according to one embodiment.

FIG. 1 shows the perspective view of the excavator arm, which consists of a sheet-metal box construction. At one end of the excavator arm the bent end plate 3 is provided, to which the two bearing plates 2 aligned parallel to each other are welded. It can be seen here that the two bearing plates 2 not only extend along the end plate 3, but also extend around the edge towards the plate 13 forming the upper chord. There, the bearing plates 2 exhibit an outwardly curved course in the direction of the lateral edge of the excavator arm and only end on lateral broadenings 13a of the upper chord plate 13, which protrudes beyond the respective side wall 14 of the sheet metal construction.

Figure 2:
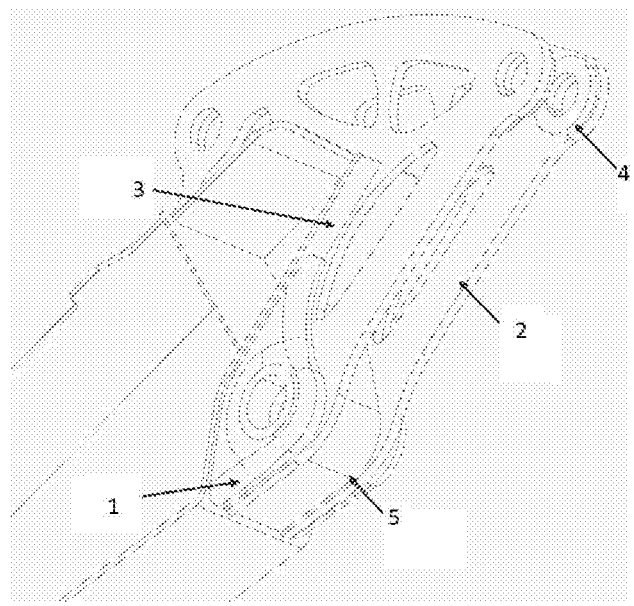
FIG. 2: shows a perspective detail view of the bearing plates of the excavator arm of FIG. 1, FIG. 3: shows a side view of the excavator arm according to an embodiment with demounted bearing surfaces.

The bearing point 10 for mounting the excavator arm on an excavator boom is formed by at least one casting inserted between the bearing plates 2. Bores of the bearing plates 2 form the opening of the bearing point 10. Annular reinforcing plates 1 as shown in FIGS. 2, 3 and 4 are each mounted around the bores of the bearing plates 2 on their outer sides. To protect the bearing point 10 from soiling, the cover plate 5 also is incorporated between the two bearing plates 2 from below and welded both to the bearing plates 2 and to the end plate 3 as shown in FIG. 4.

The incorporated casting is connected to the two bearing plates 2 by means of a fillet weld. Besides the boom bearing, the two bearing plates 2 provide further bearing points, such as the bearing 12 for accommodating the excavator arm cylinder. Another bearing point 11 is provided in the vicinity of the upper chord 13 of the bearing plates 2. The same serves to fasten the cylinder for actuating the attachment, such as a bucket cylinder. The bearing plates 2 also are provided with a plurality of cutouts to save weight.

The distance of the two bearing plates 2 to each other can be varied flexibly and is not necessarily specified by the width of the boom bearing point 10 or the remaining bearing points 11, 12. This is made possible by the fact that at the bearing point 10 the bearing width of the boom bearing point 10 can be increased by the attachment of the annular reinforcing plates 1, in particular by a suitable choice of the thickness of the reinforcing plates 1. A similar procedure is used for the remaining bearing points 11, 12. As for mounting the corresponding cylinders, a smaller bearing width is required, and corresponding annular reinforcing plates 4 are not arranged on the outside of the bearing plates 2 at the bearing points 11, 12, but instead on their inside. The distance of the bearing plates thereby is reduced and the resulting bearing width is narrowed.

FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The invention claimed is:

1. An excavator arm,
  the excavator arm formed of box sheet metal,
  at least one bearing plate mounted on an exterior of an end plate of the box sheet metal forming a boom bearing, and at least one reinforcing plate applied onto an exterior of the at least one bearing plate around the boom bearing, wherein two symmetrical bearing plates are aligned parallel to each other and include bearing reinforcements, wherein the bearing plates extend onto a planar surface of an upper chord of the excavator arm, exhibit a curved course in a direction of a lateral edge of the excavator arm, and only end on a lateral extension of the upper chord.

2. The excavator arm according to claim 1, wherein the at least one bearing plate comprises bearing reinforcements.

3. The excavator arm according to claim 2, wherein the bearing reinforcements are castings or plates.

4. The excavator arm according to claim 3, wherein the casting is covered towards the exterior by means of a cover incorporated between the bearing plates, and wherein the cover is a sheet-metal part that is connected to the bearing plates and the end plate is bent.

5. The excavator arm according to claim 1, wherein the boom bearing is welded to the bearing plates and/or to the end plate via a fillet weld or is bonded to the bearing plates.

6. The excavator arm according to claim 1, wherein the bearing plates are shaped identically.

7. The excavator arm according to claim 1, wherein the bearing plates include at least one further bearing.

8. The excavator arm according to claim 7, wherein in a vicinity of the at least one further bearing a reinforcing plate, casting, or machined part is applied onto the inside of at least one bearing plate.

9. The excavator arm of claim 8, wherein the reinforcing plate is an annular reinforcing plate.

10. The excavator arm according to claim 1, wherein the reinforcing plate is an annular reinforcing plate.

11. The excavator arm of claim 1, wherein two of the at least one bearing plates comprise holes forming a bore of the bearing and two of the at least one reinforcing plates comprise holes forming the bore of the bearing, the end plate extends parallel to the bore of the bearing, and the two bearing plates and two reinforcing plates extend perpendicular to the end plate and the bore of the bearing.

12. The excavator arm of claim 1, wherein two of the at least one bearing plates and two of the at least one reinforcing plates comprise holes forming a bore of the bearing.

13. A construction machine, comprising:
an excavator arm substantially formed of box sheet metal,
two symmetrical bearing plates aligned parallel to each other, extending onto a planar surface of an upper chord of the excavator arm, curving in a direction of a lateral edge of the excavator arm, and ending on a lateral extension of the upper chord, the bearing plates comprising at least one further bearing and bearing reinforcements, at least one bearing plate mounted on an exterior of an end plate of the box sheet metal forming a boom bearing, and
at least one reinforcing plate applied onto an exterior of the at least one bearing plate around the boom bearing.

* * * * *